United States Patent [19]

Kutta et al.

[11] Patent Number: 5,256,729
[45] Date of Patent: Oct. 26, 1993

[54] NITRILE DERIVATIVE FOR SAND CONTROL

[75] Inventors: Helmuth Kutta, Richardson, Tex.; Robin Wiser-Halladay, Huntsville, Ala.

[73] Assignee: Atlantic Richfield Company, Los Angeles, Calif.

[21] Appl. No.: 7,472

[22] Filed: Jan. 22, 1993

Related U.S. Application Data

[62] Division of Ser. No. 754,550, Sep. 4, 1991, Pat. No. 5,199,491.

[51] Int. Cl.⁵ .............................................. C08G 18/80
[52] U.S. Cl. ................................... 524/700; 524/871; 524/873; 528/45
[58] Field of Search ....................... 524/700, 871, 873; 528/45

[56] References Cited

U.S. PATENT DOCUMENTS

| | | |
|---|---|---|
| 2,867,278 | 1/1959 | Mallory et al. ....................... 166/33 |
| 3,531,425 | 9/1970 | Burk, Jr. et al. ....................... 260/22 |
| 3,652,507 | 3/1972 | Burk, Jr. et al. ....................... 260/77.5 |
| 3,976,135 | 8/1976 | Anderson ............................. 166/276 |
| 4,113,014 | 9/1978 | Kubens et al. ....................... 166/295 |
| 4,785,884 | 11/1988 | Armbruster ......................... 166/280 |
| 4,920,192 | 4/1990 | Wiser-Halladay ..................... 528/48 |
| 5,048,608 | 9/1991 | Wiser-Halladay et al. ......... 166/276 |

*Primary Examiner*—Maurice J. Welsh
*Attorney, Agent, or Firm*—James C. Fails; Arthur F. Zobal; Geoffrey A. Mantooth

[57] ABSTRACT

A composition and method for consolidating proppant or gravel for propping fractures about, or for gravel packs for sand control in, wells in subterranean formations characterized by an improvement in which there is used a combination of reactants, including a capped diisocyanate that will produce polyurethane and coat the catalyst in situ. Also disclosed are specific examples of satisfactory frac fluids, diluents and catalysts for both a specially designed one-pass system and, preferably, a two-pass system of putting and consolidating the proppant in a fracture.

4 Claims, No Drawings

NITRILE DERIVATIVE FOR SAND CONTROL

This is a division of application Ser. No. 07/754,550, filed Sep. 4, 1991, now U.S. Pat. No. 5,199,491.

FIELD OF THE INVENTION

This invention relates to consolidation of proppants in fractures about a well penetrating subterranean formations. More particularly, this invention relates to consolidating coated proppants that are injected into fractures in a subterranean formation under conditions such that the proppant will set up or cure, to consolidate and remain in place and resist crushing, closing of the fracture or being flowed back into the wellbore.

BACKGROUND OF THE INVENTION

The prior art has seen a wide variety of different approaches to consolidating proppants injected into fractures.

Hydraulic fracturing of a formation adjacent a borehole increases productivity of desirable hydrocarbonaceous fluids from the subterranean formation by creating channels of high fluid conductivity. In fracturing of formations, two major difficulties have been encountered. The first of these is proppant flowback. This decreases the amount of proppant holding the fractures pen, allowing closing of the fractures and causing reduced permeability. The second problem is sand production from the subterranean formation. The produced sand tends to lower productivity, also.

Resin-coated proppants which have the ability to consolidate have the potential to minimize both problems. Most of the commercial resin-coated proppants used today are heat cured and are therefore consolidatable only at high temperatures and pressures found in deep wells.

This leaves a long felt need for consolidation of proppants about low temperature wells such as shallow wells and those found in Alaska.

It is desirable to have relatively high strength so as to resist crushing of the proppant when consolidated. In this way, the proppant is retained in the formation, is not produced back into the borehole or the like. Resin-coated proppants consolidated downhole have been used to offset this problem.

Any resin-coated proppant should be compatible with the fracturing fluids used to carry it downhole and be as economical as possible. Moreover, extra steps should be curtailed when feasible and eliminated where possible since the additional steps that may be required adds to the expense.

The closest prior art that the inventors are aware of is the patent application on which one of the co-inventors is also co-inventor entitled "CONSOLIDATION OF HYDRAULIC FRACTURES EMPLOYING A POLYURETHANE RESIN" Ser. No. 07/410,859, filed Sep. 22, 1989 and now U.S. Pat. No. 5,048,608. That application is assigned to the same assignee as is this application.

The prior art has ranged from U.S. Pat. No. 3,851,479, showing sealed porous earth formations where void spaces are reduced with the treatment with aqueous solutions containing hydroxyl, polyisocyanurates, and polyvinyl alcohol, through U.S. Pat. No. 4,114,382, concerned with consolidating geological formations with a polyol and a special 1, 2-alkylene oxide, to recent patents; such as, U.S. Pat. No. 4,719,002, describing a method for preparing a molded reaction injection rigid non-cellular polyisocyanurates, and U.S. Pat. No. 4,731,427, describing a method of preparing molded reaction injection rigid polyurethane modified isocyanurate polymer composition. While these patents are pertinent chemically in that the reactants initially are similar, the result is vastly different from the invention herein.

It is desirable that any method of coating a proppant to provide downhole consolidation have the following features not heretofore provided:

1. A problem has been that, when simulating shearing action that the coated proppant will undergo before or during pumping downhole, the turbulent motion should not cause premature polymerization of the resin. Expressed otherwise, polymerization should not be occurring at this time. It is desirable that a reduced degree of reactivity of any coating be achieved so it does not come off the proppant when admixed with the carrier;

2. it is desirable that the system for consolidating proppant be applicable to either a one step method in which a catalyst is admixed with the admixture of diluent, and proppant or a two step method in which the sand that is coated with a capped reactant and diluent, can be injected and then a catalyst overflushed, or flushed, as a minor proportion of a carrier liquid It is also desirable that the coated proppant have properties set forth in a co-pending patent filed the same date as the earlier cited 07/410,859 by Robin Wiser-Halladay as inventor and entitled "A POLYURETHANE QUASI PREPOLYMER FOR PROPPANT CONSOLIDATION", U.S. Pat. No. 4,967,830. The descriptive matter of that patent is incorporated herein in abbreviated form so that the reader will not have to advert to that patent; but, in any event, is incorporated herein by reference for any details that may have inadvertently been omitted herefrom;

3. the original reactants material should be relatively safe and not reactive with moisture, hence a blocked or "capped" type diisocyanate is preferred. The block, or cap can then be removed to react in situ, once the fluid containing the capped diisocyanate is in place.

The prior art has failed to provide the foregoing delineated features and to provide a proppant that can be cured in situ after it is emplaced in the formation, even in low temperature wells.

SUMMARY OF THE INVENTION

Accordingly, it is an object of this invention to provide a resin-coated proppant that can be cured in low temperature wells to set and provide a consolidated proppant-packed fracture, simultaneously supplying the features delineated hereinbefore as being desirable and not heretofore provided.

Specifically, it is an object of this invention to provide an economical resin-coated proppant that can be cured in low temperature wells and that can have substantially all of the features delineated hereinbefore as desirable and not heretofore provided.

These and other objects will become apparent from the descriptive matter hereinafter.

In accordance with this invention there is provided a method of consolidating a proppant in a fracture about a well penetrating a subterranean formation by an improved method which employs a resin system that initially comprises a safe diol and a relatively safe, capped diisocyanate selected from a class consisting of adipodinitrile carbonate, adipodinitrile sulfite and adipodinitrile oxalate. This reaction system is employed with a diluent so as to form oligomers of polyurethane that can be admixed with a proppant in situ.

DESCRIPTION OF PREFERRED EMBODIMENTS

The oligomers are formed by first removing the cap and reacting the ingredients in situ. The cap may be removed by either heat or a catalyst. The heat may be from 180 degrees centigrade or so. An even lower temperature of about 165 degrees centigrade can be employed with suitable metals in an environment and obtain removal of the cap.

Where temperatures in this order of magnitude are unlikely, as in shallow wells or in wells in Alaska, a catalyst can be employed Suitable catalysts include the strongly alkaline material; such as the triethylamine, potassium or sodium alkoxide, or strongly basic organometallic compound. Suitable organic catalysts include catalysts like dibutyltin dilaurate, triethylene diamine (DABCO), with epoxy as needed and up to about 0.5 percent excess calcium; dibuyltin dilaurate triethylene diamine (DABCO), with only about 0.5 percent excess calcium; stannous octoate, triethylene diamine (DABCO) with or without epoxy and only about 0.5 percent excess calcium; and zinc octoate with dibutyltin dilaurate and only about 0.5 percent excess calcium If desired, zinc octoate can be employed along with only about 5 percent excess calcium to effect the catalytic unblocking of the reactant for reacting with the moisture in situ. Specifically, the acrylonitrile carbonates or sulfites are stable compounds and can be mixed with the hydrogen-containing compounds without undergoing an immediate reaction. This will allow the mixture to be transported to the fracture zone without prior reaction even if the zone contains some water. A ring opening reaction in the zone can then be initiated. Data obtained indicates that catalytic order of activity at 120 degrees C. to be about as follows: Dabco greater than Dabco plus T-12 greater than Dabco plus T-9 greater than Burk's Catalyst These raw catalyst systems are now commercially available as follows: T-9, stannous octoate, M&T Chemicals, Inc.; T-12, Dibutyl tin dilaurate, M&T Chemicals, Inc.; Dabco, Triethylene diamine, Houdry Division, Air Prod. & Chem Inc. The reaction can be achieved by suitable metal ions such as tertiary amines or heat to give the reacting isocyanate and subsequently the polyurethane with liberation of carbon dioxide or sulfur dioxide, depending on the type of precursor used. The advantage of these procedures are as follows:

1. handling of blocked isocyanate is much less dangerous than the open, highly reactive isocyanate;
2. mixing with the substrate, polyol, diamine and the like can take place prior to use without undergoing a reaction; and
3. the formation of carbon dioxide or sulfur dioxide may be advantageous for certain formations in that permeability to the flow of the desired hydrocarbonaceous fluid is increased.

Even more specifically, the possible advantages of the adipodinitrile carbonate (or sulfite) reactant as follows:

1. The initial reactants are stable compounds that do not react readily with moisture; are somewhat soluble in dipropylene glycol and have a reaction that can be initiated downhole, at least with certain catalysts even in low temperature wells.

2. The reactants can be mixed with a glycol without immediate urethane formation, so even a one-step procedure can be designed.

3. The reactants decrease the viscosity problem of placement.

4. The procedure eliminates prepolymer formation in a separate reaction or the like.

5. Partial prepolymerization, if required, can be achieved by adding small amounts of a catalyst.

6. The solution can be pumped to the frac site, or in situ, and later treated to form the polyurethane for coating and consolidating the proppant.

7. The catalyst can be added in an overflush operation to initiate the reaction in situ, or can be emplaced first and the composition containing the reactants then emplaced to complete the reaction.

8. Good catalysts are the tertiary amines such as triethylamine, potassium or sodium alkoxide, or strong basic organometallic compounds.

9. Release of carbon dioxide or $SO_2$ increases the permeability for easier flow of the desired hydrocarbonaceous fluid.

10. If

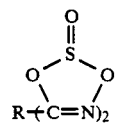

is used the formation of urethane liberates sulfur dioxide which with water forms sulfurous acid which may have a beneficial effect in increasing permeability along fractures.

The polyurethanes from the capped isocyanates it is theorized, can be seen as follows: The adipodinitrile carbonates are shown in the structural formula I.

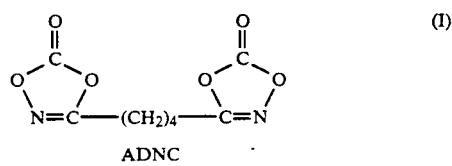

ADNC

The adipodinitrile sulfites are as shown in structural formula II.

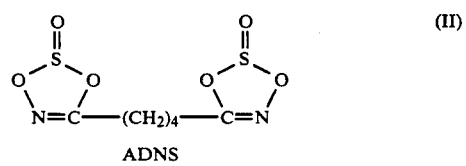

ADNS

The corresponding aromatic diisocyanate carbonate precursor is shown in structural formula III.

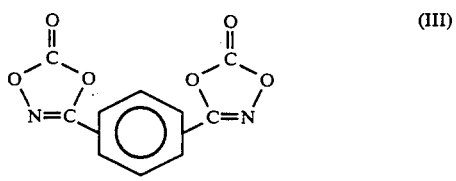

-continued

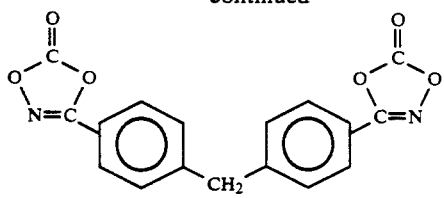

The corresponding aromatic diisocyanate sulfite precursor is shown in structural formula IV.

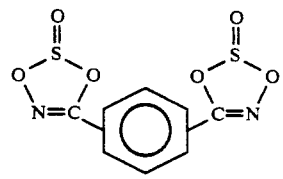

(IV)

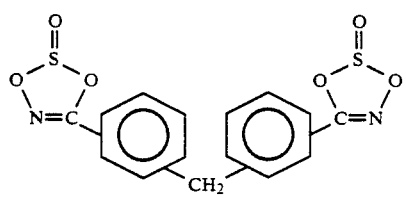

The reaction of the urea in the biuret linkage is shown in structural formula V.

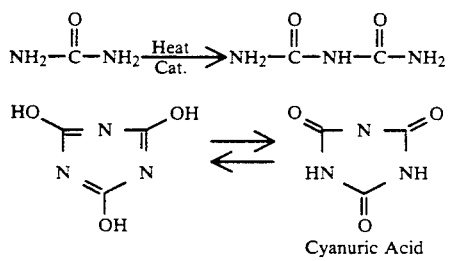

(V)

The allophanate linkage is shown in structural formula VI.

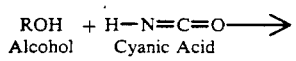

(VI)

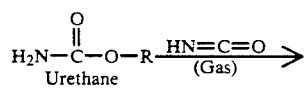

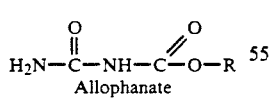

or

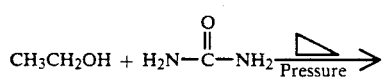

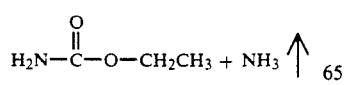

The Hoffmann Rearrangement is shown in structural formula VII.

Hoffman Arrangement

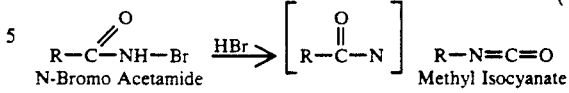

(VII)

The reaction of isocyanate with water is shown in structural formula VIII.

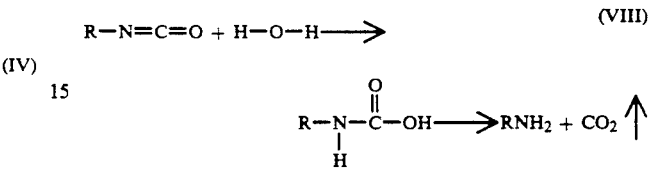

(VIII)

The reaction of isocyanate with alcohol is shown in structural formula IX.

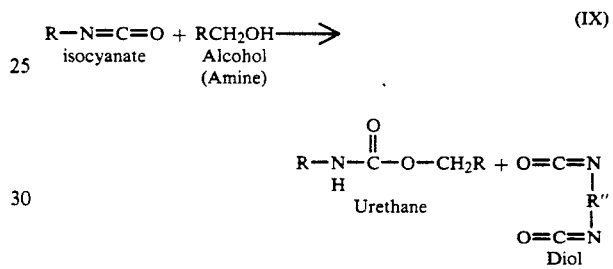

(IX)

The diol reaction with diisocyanate to produce polyurethane is shown by structural formula X.

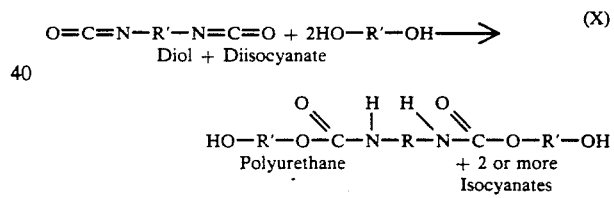

(X)

The urethane is a carbonyl-containing functional group in which the carbonyl carbon is bound to both an ether oxygen and to an amine nitrogen as shown in structural formula XI.

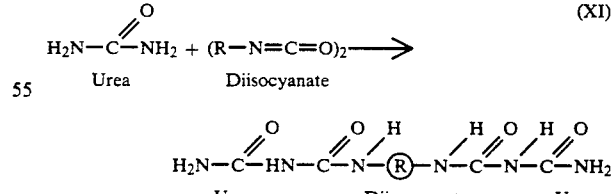

(XI)

It can be polymerized or made into a polyurethane by reaction with a diol as shown in structural formula XII.

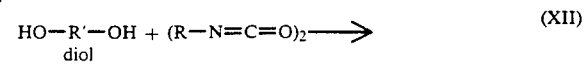

(XII)

-continued

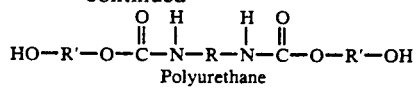
Polyurethane

If desired, a one-step process can be designed but it may encounter difficulty if not designed properly.

In placement, the solution containing catalyst is placed first or may overwash the reactants as an afterflush to uncap the reactant diisocyanate so it is allowed to react with the diols in situ. As an example, we have found that if the reactants are allowed to stand for a period exceeding two hours at a temperature of at least 25 degrees C. (77 degrees F.) satisfactory oligolmers of the polyurethane are formed.

A number of catalysts, including the tertiary amines and the organometallics have been shown to achieve this uncapping and consolidation. Additionally, this resin system may have the desired chemistry to effect consolidated proppants in the presence of a hydrocarbon based frac fluid as well as the in situ hydrocarbons that have been tested with this approach. It is anticipated that a hydrocarbon fracture fluid will be employed in the development of these low temperature formations because the resin is not compatible with aqueous fluids, because of the water sensitive nature of the various formations and because the subzero ambient temperatures cause freezing problems when water or aqueous solutions are employed.

The consolidation chemicals developed and tested in this invention have potential for use in the oil field. This invention is preferably employed with the two-pass procedure in which pumping of the resin system, or reactants, can be pumped into place and then contacted in situ to effect the uncapping so as to be more reactive to the in situ water after uncapping is effected. The fracture fluid can be lease crude or more, preferably, refined or extract oils that are commercially available fluids, such as, the Nuso-250, from Exxon, or Tufflo-491, from ARCO. The Nuso-250 and Tufflo-491 are trademarked oils. They are known as extract oils and are formed by approximately the same procedure. The Tufflo 491 is produced by heating crude oil to 760-780 degrees F., as discussed in co-pending application "RESIN SYSTEM FOR IN SITU PROPPANT CONSOLIDATION", Ser. No. 07/410,859, referred to hereinbefore. The discussion of that application is incorporated herein for any information omitted herefrom.

The invention works regardless of whether any theory of how the coating and consolidation material is formed is accurate or can be proven easily.

The sand, alone or with a catalyst, can be set in place or cured in situ if it is employed as the proppant.

Any of the usual methods that are employed in this art to put the proppant into formation may be employed herein, including other ways of admixing the catalyst with the proppant, such as the sand or the like.

In any event, it is known that the consolidation can be effected at temperatures below 100 degrees F.; for example, 60-90 degrees F. The consolidation is believed effective without organo functional silane groups to form the chemical bridge and no silanation is necessary in this invention. This represents a distinctly different approach to the consolidation formerly effected with the reactants requiring at least relatively high temperature wells such as those having temperatures above 140 degrees F.

If crudes which contain no internal catalytic species are employed, it may be necessary to add slow-acting catalysts, such as water. (some of the North slope crudes catalyze the polymerization once the cap is removed).

The proportion of the liquid carrier and the proppant, or sand, where it is employed as the proppant is about 20 pounds of proppant, or sand, per gallon of liquid extract or distillate carrier or the like. This is then diluted even more with crude perhaps after the resin has coated the proppant, or sand, to bring it to the proper proppant to fluid proportions for the operation.

The amount of the reactants will be about 2–6 percent, preferably about 2–5, percent by weight of the sand. It is noteworthy that when 6 percent or more is employed there is a notable diminishing of the permeability of the consolidated proppant.

For the so called two-pass procedure, as preferably employed herein, the catalyst is pumped in as an overflush ordinarily.

The catalyst may be employed in a small or minor concentration as low as 2 percent or so. Preferably, no more than about 2 percent of the catalyst is employed when it is a tertiary amine, metal alkyl or synergistic admixture thereof. Consolidation with these catalysts is achieved within minutes and the compressive strengths obtained are sufficiently high to be considered satisfactory. Maximum strength is achieved under eight (8) hours time.

This procedure is particularly adapted and effective for gravel packing operations since most methods of consolidating gravel packing packs consist of two or more treatment passes. Only the immediate area around the wellbore would be consolidated.

Strengths of at least 400 psi are routinely obtained where proppant packs are allowed to consolidate for twenty-four hours. Over extended time it is to be expected that strengths in excess of 1000 psi would be obtained.

In the examples that we have tested, the fracture conductivity upon consolidated packs will be at least 90 percent of the conductivity of the virgin sand and so are better than fracture conductivity measured on proppants in gelled hydrocarbon environments of the prior art.

The polyurethanes that herein are employed are resistant to acidization and typically show fracture conductivities on the order of 4–5 Dorsey feet fracture conductivity even after polymerization is completed. They show excellent stability to flowing crudes.

In operation, the lease crude extract, if employed, is distilled or refined oil having proper viscosity, if employed, is used to carry the proppant into formation or admixed with the proppant which is coated with the resin. After the fracture is completed, the proppant is emplaced, the catalyst added or, on the other hand, the catalyst will have been emplaced first and the reactants then emplaced to be uncapped later by the catalyst once emplaced adjacent the catalyst. If desired, the fracture fluid, which may be the above delineated carrier, may also contain the catalyst. For example, any carrier may contain a minor amount of water if a moisture cure is to be employed. It contains a tertiary amine if the tertiary amine is employed as the catalyst alone. On the other hand, the catalyst in its solution may be flushed over the admixture of the proppant and the capped reactant if desired. This latter process is referred to as a two-pass system and the overflush of the resin or fluid containing the catalyst allows the catalyst to effect a cure of the resin on the proppant and effect proppant consolidation even at low temperatures as low as 60 degrees Fahrenheit.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A composition comprising:
   a. an admixture of proppant, diluent diol and a capped diisocyanate selected from the class consisting of adipodinitrile carbonate, adipodinitrile sulfate, and adipodinitrile oxylate.

2. The composition of claim 1 further comprising in said admixture, sand as a proppant and a slow-acting catalyst in a minor proportion within said admixture of said diol, capped diisocyanate, diluent, and sand.

3. The composition of claim 2 wherein said catalyst is selected from the class consisting of an amine and water and is employed in a minor amount in a carrier liquid.

4. The composition of claim 1 formed by admixing from 95-98 parts by weight of sand as proppant with each 2-5 parts by weight of reactants.

* * * * *